United States Patent
Sawamoto et al.

(10) Patent No.: US 7,181,645 B2
(45) Date of Patent: Feb. 20, 2007

(54) METHOD AND APPARATUS FOR STORING MAIN DATA WITH TWO CHECKUP DATA

(75) Inventors: Tetsuo Sawamoto, Anjo (JP); Seiji Miyamoto, Kariya (JP)

(73) Assignee: Denso Corporation, Kariya (JP)

( * ) Notice: Subject to any disclaimer, the term of this patent is extended or adjusted under 35 U.S.C. 154(b) by 460 days.

(21) Appl. No.: 10/286,917

(22) Filed: Nov. 4, 2002

(65) Prior Publication Data

US 2003/0126499 A1    Jul. 3, 2003

(30) Foreign Application Priority Data

Dec. 27, 2001    (JP)    ............... 2001-398084

(51) Int. Cl.
*G06F 11/00*    (2006.01)
(52) U.S. Cl. .................................................. 714/13
(58) Field of Classification Search ............... 714/13, 714/6, 766, 758, 767, 52, 58
See application file for complete search history.

(56) References Cited

U.S. PATENT DOCUMENTS

| | | | |
|---|---|---|---|
| 3,831,174 A * | 8/1974 | King et al. ............... 342/90 |
| 4,621,335 A * | 11/1986 | Bluish et al. ............ 340/945 |
| 4,802,117 A * | 1/1989 | Chrosny et al. .......... 714/5 |
| 4,939,652 A * | 7/1990 | Steiner .................... 701/35 |
| 5,007,053 A * | 4/1991 | Iyer et al. ................ 714/718 |
| 5,406,425 A * | 4/1995 | Johnston et al. ......... 360/48 |
| 5,909,391 A * | 6/1999 | Loibl .................... 365/185.08 |
| 5,935,268 A * | 8/1999 | Weaver .................. 714/758 |
| 5,942,004 A * | 8/1999 | Cappelletti ............. 714/763 |
| 5,996,113 A * | 11/1999 | Korn et al. .............. 714/807 |
| 6,009,548 A * | 12/1999 | Chen et al. .............. 714/762 |
| 6,052,818 A * | 4/2000 | Dell et al. ............... 714/773 |
| 6,065,148 A * | 5/2000 | Obermeier et al. ....... 714/763 |

FOREIGN PATENT DOCUMENTS

| | | |
|---|---|---|
| JP | 64-46557 | 2/1988 |
| JP | 04-367047 | 12/1992 |
| JP | 7-84894 | 3/1995 |

\* cited by examiner

*Primary Examiner*—Robert W. Beausoliel
*Assistant Examiner*—Elmira Mehrmanesh
(74) *Attorney, Agent, or Firm*—Nixon & Vanderhye, P.C.

(57) ABSTRACT

An electronic control unit has a microcomputer and a backup RAM, which stores its data irrespective of ON/OFF of an engine ignition switch. The backup RAM stores a main data in its storage area, and two checkup data in its storage areas, respectively. The two checkup data are calculated as a two-byte data from the main data of a 4-byte floating points type data and equal to each other. The microcomputer executes a data storing operation in the order of one checkup data, the main data and the other checkup data. The microcomputer determines that the main data is correct when either one of the checkup data is determined correct.

13 Claims, 3 Drawing Sheets

METHOD AND APPARATUS FOR STORING MAIN DATA WITH TWO CHECKUP DATA

CROSS REFERENCE TO RELATED APPLICATION

This application is based on and incorporates herein by reference Japanese Patent Application No. 2001-398084 filed Dec. 27, 2001.

FIELD OF THE INVENTION

The present invention relates to a method and apparatus for storing main data with two checkup data.

BACKGROUND OF THE INVENTION

In a computer system such as a vehicle control computer system, control data calculated as main data are stored as backup data in a backup memory together with checkup data, so that the backup data may be later checked up by using the checkup data. For instance, in a mirror checkup method, a reverse data of the main data are stored as the checkup data and the main data is compared with the reverse data to determine whether the main data is normal.

In some instances, the main data and the checkup data cannot be written into the backup memory at the same time when the main data is updated. If the main data has a 4-byte data length and is calculated by a 32-bit microcomputer, writing of the main data and the checkup data are performed separately in two stages. That is, the main data is written first followed by writing of the checkup data. If power supply cut-off occurs between the writing of the main data and the subsequent writing of the checkup data, the main data may be determined later to be incorrect due to erroneous writing of the checkup data.

It is proposed to improve reliability of the main data by storing the main data together with two mirror data as the checkup data. In this instance, the data writing in the backup memory is performed by writing in sequence the checkup data, the main data and again the checkup data, so that the main data may not be determined to be erroneous due to the power supply cut-off between the data writing operations. However, this requires more data storage areas in the backup memory, because the mirror data also have the same data length as that of the main data.

SUMMARY OF THE INVENTION

It is therefore an object of the present invention to provide a method and apparatus, which enables storing of main data with checkup data without increasing data storage areas in a backup memory.

According to the present invention, an electronic control unit has a microcomputer and a backup memory having first, second and third storage areas. The microcomputer is programmed to calculate a main data and two checkup data, and store the main data and the two checkup data in the first, the second and the third storage areas of the backup memory, respectively. Each of the two checkup data has a data length smaller than that of the main data.

Preferably, the microcomputer stores the main data in the first storage area between storing the two checkup data in the second and the third storage areas. The main data is a floating points type, and each data length of the two checkup data is one half of that of the main data. The microcomputer is further programmed to determine whether the main data is correct by comparing at least one of the two checkup data with a third checkup data.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
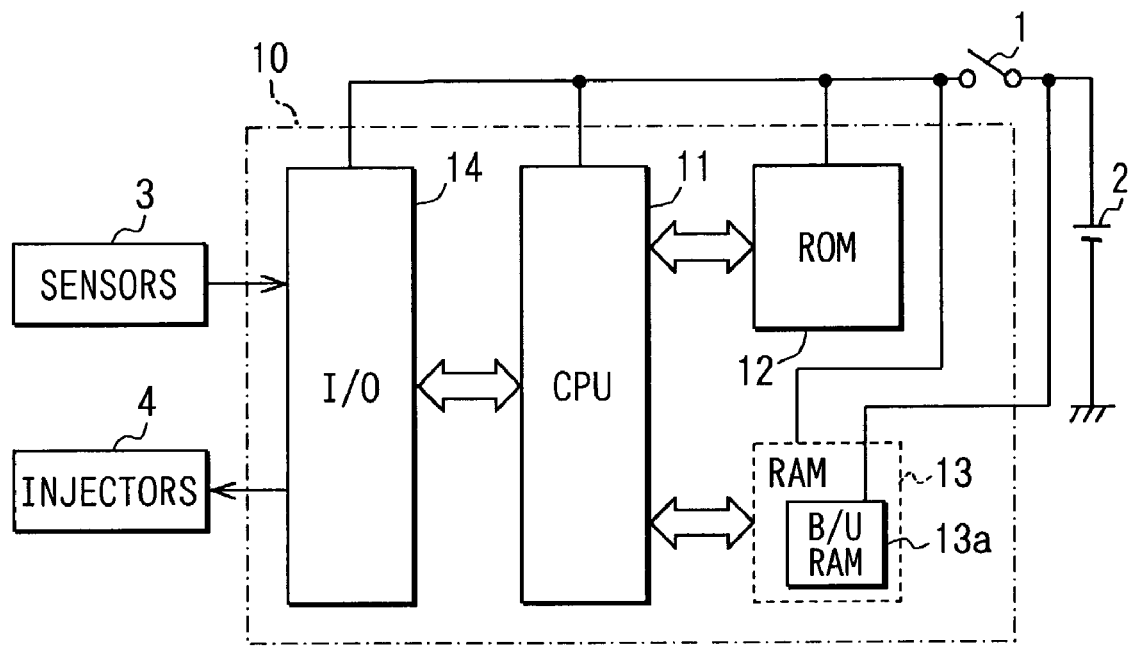
FIG. 1 is a block diagram showing a vehicle engine control system according to an embodiment of the present invention.

Referring to FIG. 1, an electronic control unit 10, for a vehicle engine control system has a CPU 11, ROM 12, RAM 13, input/output circuit (I/O) 14 and the like. This unit 10 is connected to a storage battery 2 through an ignition switch 1 to be supplied with electric power. The CPU 11 in this embodiment is a 32-bit microcomputer. The RAM 13 has a backup RAM 13a as a backup memory. The backup RAM 13a is supplied with the electric power from the battery 2 bypassing the ignition switch 1, so that data stored in the backup RAM 13a are maintained irrespective of ON/OFF operation of the ignition switch 1.

The apparatus 10 is connected to various sensors 3 and fuel injectors 4. The CPU 11 calculates a fuel injection quantity required by an engine based on engine conditions detected by the sensors 3 and applied through the I/O 14, and controls the fuel injectors 4 by way of the I/O 14 based on the calculated fuel injection quantity. The CPU 11 also calculates a fuel correction value CLRN as a learning value of the fuel injection quantity from the detected engine conditions in the known manner. This correction value CLRN is stored as the main data in the backup RAM 13a.

Figure 2:
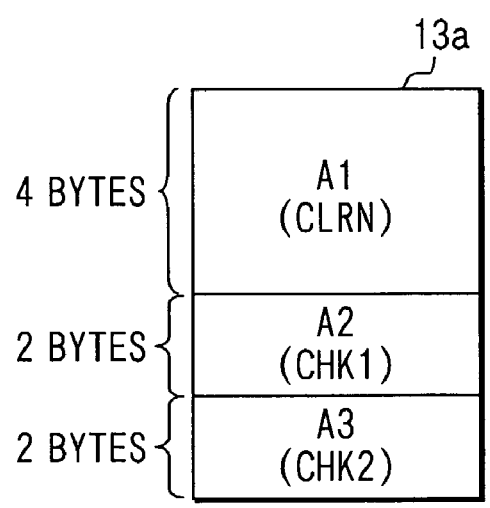
FIG. 2 is a schematic diagram showing a backup memory used in the embodiment.

In addition to the correction value CLRN as a main data, the backup RAM 13a stores checkup data. The checkup data are formed from the correction value CLRN. As shown in FIG. 2, the backup RAM 13a has storage areas A1, A2, A3. The correction value CLRN is stored in the area A1, which is provided as a main data storage area. The correction value CLRN is defined as a 4-byte data of a floating decimal points-type. The checkup data are stored in the areas A2 and A3, which are provided as checkup data storage areas. Each of the checkup data is defined as a two-byte data, which is one half of the correction value CLRN with respect to data length.

In case that the correction value CLRN is defined in 4-byte length, the CPU 11 is incapable of writing both the correction value CLRN and its checkup data CHK1 and CHK2 in the backup RAM 13a at the same time. Therefore, the CPU 11 writes those data CLRN, CHK1 and CHK2 individually into the backup RAM 13a.

Figure 3:
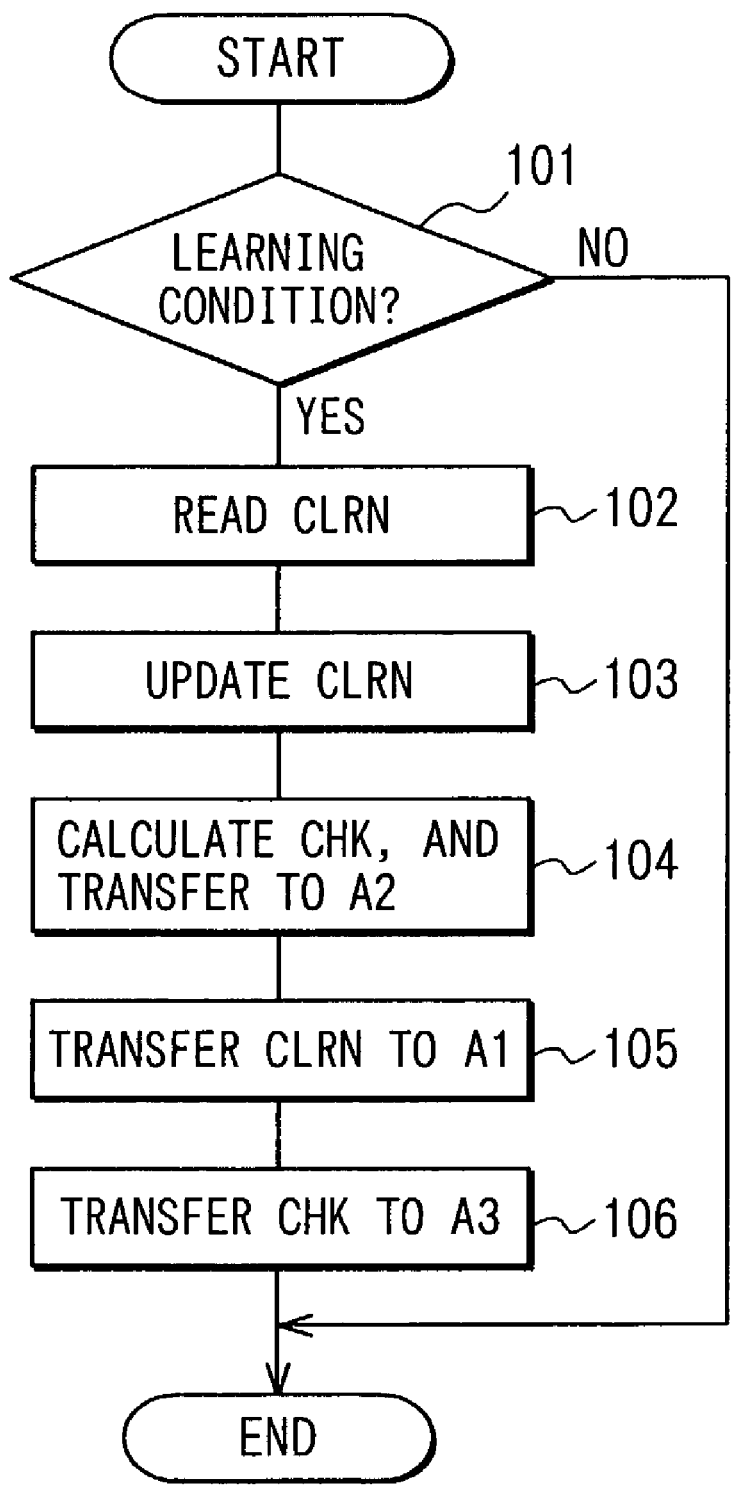
FIG. 3 is a flow diagram showing backup data updating processing executed in the embodiment.

More specifically, the CPU 11 is programmed to perform data writing processing as shown in FIG. 3. The CPU 11 first determines at step 101 whether the engine is in a predetermined operation condition, in which learning of the correction value CLRN is possible. If NO, the CPU 11 ends this processing. If YES, the CPU 11 executes data reading processing at step 102 to read the present correction value CLRN from the backup RAM 13a. Then the CPU 11 calculates or updates at step 103 the correction value CLRN based on the detected engine conditions such as intake air quantity and engine rotation speed. This updated correction value is temporarily stored in a predetermined register area.

The CPU 11 calculates at step 104 a checkup data CHIK from the correction value CRLN updated at step 103. Specifically, the checkup data CHK is calculated by adding the highest 2-byte data and the lowest 2-byte data of the updated correction value CLRN and by taking only the lowest 2-byte data out of the sum of the added two 2-byte data. This resultant data CHK is transferred as the checkup data CHK1 to the storage area A2 of the backup Ram 13a. The CPU 11 then transfers at step 105 the updated correction value CLRN as the main data from the resistor area to the storage area Al of the backup RAM 13. The CPU 11 finally transfers the above data CHK as the checkup data CHK2 to the storage area A3 of the backup RAM 13a at step 106.

Figure 4:
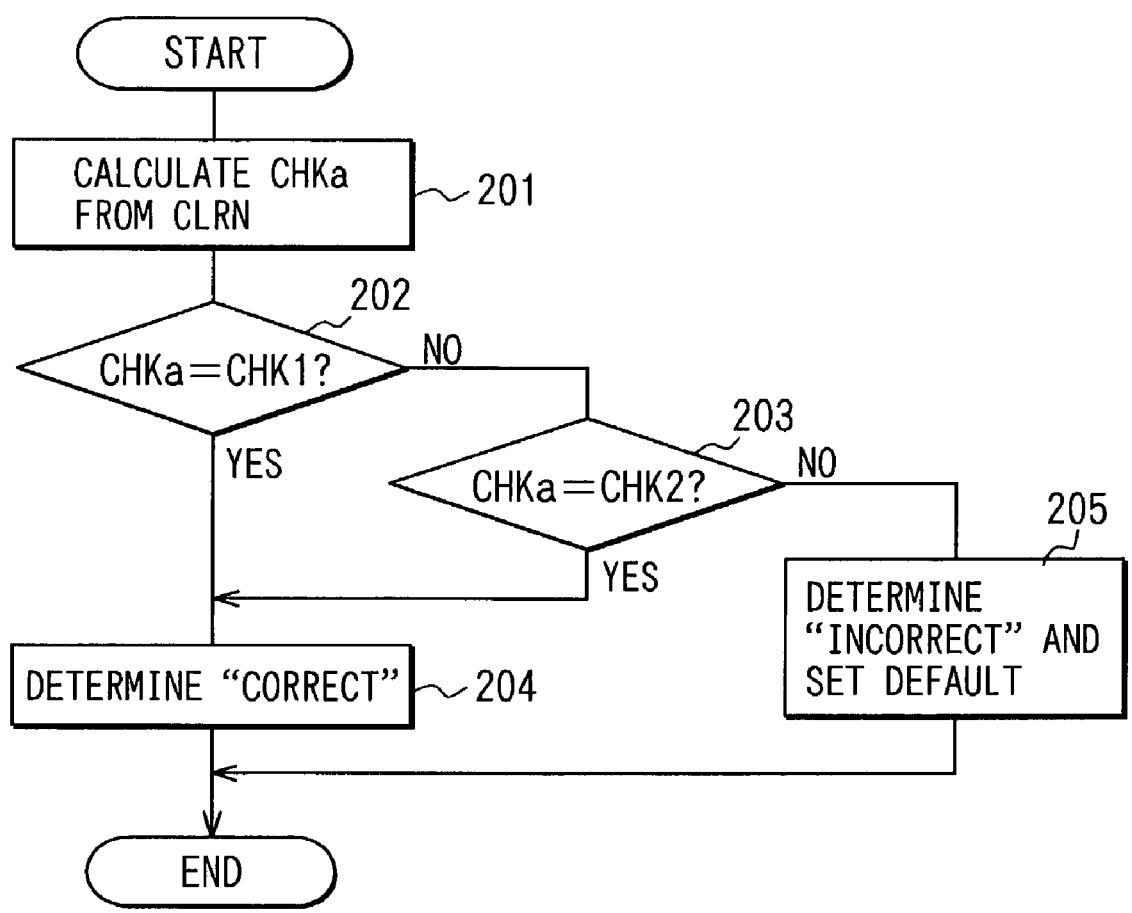
FIG. 4 is a flow diagram showing backup data checkup processing executed in the embodiment.

Further, the CPU 11 is programmed to perform data checkup processing as shown in FIG. 4, when the correction value CLRN is read out from the backup memory 13a at step 102 in FIG. 3. In this checkup processing, the CPU 11 first calculates at step 201 a checkup data CHKa from the correction value CLRN stored in the backup RAM 13a. Specifically, this checkup data CHKa is also calculated by adding the highest 2-byte data and the lowest 2-byte data of the correction value CLRN and taking only the lowest 2-byte data out of the sum. The CPU 11 then compares at step 202 the calculated checkup data CHKa with the checkup data CHK1 stored in the storage area A2 of the backup memory 13a. If NO (CHKa≠CHK1), the CPU 11 further compares at step 203 the checkup data CHKa with the checkup data CHK2. If either one of the comparison results at steps 202 and 203 is YES (CHKa=CHK1 or CHK2), the CPU 11 determines at step 204 that the correction value CLRN stored as the backup data in the backup memory 13a is correct, and ends this checkup processing. In this instance, the CPU 11 uses this correction value CLRN for updating the same at step 103 (FIG. 3) and calculating the fuel injection quantity. If the comparison results at steps 202 and 203 are NO (CHKa≠CHK1 and CHKa≠CHK2), however, the CPU 11 determines at step 205 that the correction value CLRN stored as the backup data in the backup memory 13a is incorrect. The CPU 11 thus reads or sets a default value as a new fuel correction value, thus ending this checkup processing. This default value may be used for updating the correction value CLRN at step 103 (FIG. 3) and calculating the fuel injection quantity.

In this embodiment, if the power supply from the battery 2 to the control unit 1 is cut-off between steps 104 and 105 in FIG. 3, that is, between the storing operation of the checkup data CHK1 and the storing operation of the correction value CLRN, only the checkup data CHK1 in the storage area A2 among the data CLRN, CHK1 and CHK2 is successfully updated. However, the CPU 11 determines that CHKa=CHK2 at step 203, and determines that the correction value CLRN is correct even if not updated. If the power supply from the battery 2 to the control unit 1 is cut-off between steps 105 and 106 in FIG. 3, that is, between the storing operation of the correction value CLRN and the checkup data CHK2, on the other hand, only data CHKL and CLRN are successfully updated and data CHK2 is not updated. However, the CPU 11 determines that CHKa=CHK1 at step 202, and determines that the correction value CLRN is correct. Thus, correctness of the main data (correction value CLRN can be checked up accurately.

Further, in this embodiment, the data length of each checkup data CHK1 and CHK2 is one half of that of the main data and the total data length of the main data and the checkup data is 8 bytes, which is $2^n$. Therefore, the backup memory 13a can be used most efficiently.

The above embodiment may be modified in various ways. For instance, the checkup data may be calculated from the correction value CLRN by subjecting the highest two byte data and the lowest two byte data to an exclusive-OR operation. The main data may be other than the fuel correction value CLRN. The control apparatus 10 may be for any objects other than a vehicle. The backup memory may be an EEPROM, an electrically rewritable non-volatile memory other than the battery backed-up RAM 13a.

What is claimed is:

1. An apparatus comprising:
   a backup memory having first, second and third storage areas; and
   a microcomputer programmed to calculate a main data and two checkup data, and store the main data and the two checkup data in the first, the second and the third storage areas of the backup memory, respectively,
   wherein each of the two checkup data has a data length smaller than that of the main data;
   the microcomputer stores the main data in the first storage area between storing the two checkup data in the second and the third storage area; and
   both of the two checkup data are calculated from the main data so that both of the two checkup data have a predetermined relation to the main data.

2. The apparatus as in claim 1, wherein the microcomputer is an n-bit type, and a total length of the main data and the two checkup data is larger than n-bit.

3. The apparatus as in claim 1, wherein the main data is a floating points type, and each data length of the two checkup data is one half of that of the main data.

4. The apparatus as in claim 1, wherein the microcomputer is further programmed to determine whether the main data is correct by comparing at least one of the two checkup data with a third checkup data.

5. The apparatus as in claim 4, wherein the third checkup data is calculated from the main data read out from back memory.

6. The apparatus as in claim 1, wherein both of the two checkup data are calculated from the same main data.

7. A method comprising steps of:
   determining a main data;
   determining first and second checkup data, each of the checkup data has a data length smaller than that of the main data;
   storing the first checkup data in a first checkup data storage area of a backup memory;
   storing the main data in a main data storage area of the backup memory after the first checkup data is stored; and
   storing the second checkup data in a second checkup data storage area of the backup memory after the main data is stored;
   wherein the first and the second checkup data are determined from the main data so that the first and second data have a predetermined relation to the main data.

8. The method as in claim 7, further comprising:
   reading the main data as well as the first and the second checkup data from the backup memory;

comparing the first and the second checkup data with a predetermined third checkup data; and determining that the main data is correct if at least one of the first and the second checkup data is equal to the third checkup data.

9. The method as in claim 8, wherein the main data is calculated from engine operating conditions, and the third checkup data is calculated from the main data read out from the backup memory.

10. The method as in claim 7, wherein the first and the second checkup data determined from the main data are equal to each other.

11. The method as in claim 7, wherein each data length of the first and the second checkup data is one half of that of the main data, and each data length is $2^n$ bytes with n being variable.

12. The method as in claim 7, wherein both the first and second checkup data are determined the same main data.

13. A method comprising steps of:

determining a main data by a computer mounted in a vehicle;

determining first and second checkup data by the computer from the main data to have predetermined first and second relations to the main data so that the first and second checkup data are identical or equivalent to each other;

storing the first checkup data in a first checkup data storage area of a backup memory, which is operable even after a power supply to the computer is cut-off;

storing the main data in a main data storage area of the backup memory after the first checkup data is stored; and storing the second checkup data in a second checkup data storage area of the backup memory after the main data is stored.

* * * * *